(12) United States Patent
Brand et al.

(10) Patent No.: US 12,054,244 B2
(45) Date of Patent: Aug. 6, 2024

(54) SYSTEM AND METHOD FOR PROTECTION AGAINST VORTEX RING STATE

(71) Applicant: Textron Innovations Inc., Providence, RI (US)

(72) Inventors: Albert Gerard Brand, North Richland Hills, TX (US); Ronald Lorenz Kisor, Coppell, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 28 days.

(21) Appl. No.: 18/152,924

(22) Filed: Jan. 11, 2023

(65) Prior Publication Data

US 2023/0150656 A1 May 18, 2023

Related U.S. Application Data

(63) Continuation of application No. 16/790,304, filed on Feb. 13, 2020, now Pat. No. 11,554,855.
(Continued)

(51) Int. Cl.
*B64C 27/00* (2006.01)
*B64C 27/57* (2006.01)
(Continued)

(52) U.S. Cl.
CPC ............ *B64C 27/006* (2013.01); *B64C 27/57* (2013.01); *B64D 43/02* (2013.01); *B64D 2045/0085* (2013.01)

(58) Field of Classification Search
CPC ....... B64C 27/006; B64C 27/57; B64C 27/04; B64C 27/02; B64D 43/02; B64D 2045/0085; B64D 31/06; G05D 1/0615; G05D 1/0676

See application file for complete search history.

(56) References Cited

U.S. PATENT DOCUMENTS

| 7,004,426 B2 * | 2/2006 | Kisor ..................... B64C 27/28 244/17.13 |
| 9,886,039 B2 | 2/2018 | Gillett et al. |

(Continued)

FOREIGN PATENT DOCUMENTS

WO 2004101358 A2 11/2004

OTHER PUBLICATIONS

Chenglong, L. et al., "A Vortex-ring-avoiding Descending Control Strategy for Multi-rotor UAVS," Proceedings of the 34th Chinese Control Conference, Jul. 28-30, 2015, 7 pages.
(Continued)

*Primary Examiner* — Valentina Xavier
(74) *Attorney, Agent, or Firm* — SLATER MATSIL, LLP

(57) ABSTRACT

A system and method for protecting a rotorcraft from entering a vortex ring state, the method including monitoring a vertical speed of a rotorcraft, comparing the vertical speed to a vertical speed safety threshold, and performing vortex ring state (VRS) avoidance in response to the vertical speed exceeding the vertical speed safety threshold. The performing the VRS avoidance includes determining a power margin available from one or more engines of the rotorcraft, limiting the vertical speed of the rotorcraft in response to the power margin exceeding a threshold, and increasing a forward airspeed of the rotorcraft in response to the power margin not exceeding the threshold.

20 Claims, 9 Drawing Sheets

Related U.S. Application Data

(60) Provisional application No. 62/955,855, filed on Dec. 31, 2019.

(51) Int. Cl.
*B64D 43/02* (2006.01)
*B64D 45/00* (2006.01)

(56) References Cited

U.S. PATENT DOCUMENTS

| | | |
|---|---|---|
| 10,457,417 B2 | 10/2019 | Oltheten et al. |
| 2015/0232176 A1 | 8/2015 | Gillett et al. |
| 2016/0137289 A1* | 5/2016 | Violette ................ G05D 1/102 701/14 |
| 2017/0369181 A1* | 12/2017 | Certain ................... B64C 27/04 |

OTHER PUBLICATIONS

Binet, L. et al., "VRS Avoidance as Active Function on Side-Sticks," 65th Annual Forum, May 28, 2009, downloaded from chrome-extension://efaidnbmnnnibpcajpcglclefindmkaj/https://www.researchgate.net/profile/Laurent-Binet/publication/225020215_VRS_avoidance_as_active_function_on_side-sticks/links/59c8b5b0a6fdccc719282e39/VRS-avoidance-as-active-function-on-side-sticks.pdf on Jul. 9, 2023, 20 pages.

Dang-Vu, B. et al., "Vortex Ring State Protection Flight Control Law," 39th European Rotocraft Forum, Sep. 3, 2013, downloaded from chrome-extension://efaidnbmnnnibpcajpcglclefindmkaj/https://onera.hal.science/hal-01061133/document on Jul. 9, 2023, 9 pages.

\* cited by examiner

SYSTEM AND METHOD FOR PROTECTION AGAINST VORTEX RING STATE

This application is a continuation of, and claims the benefit of, U.S. patent application Ser. No. 16/790,304, filed on Feb. 13, 2020 (now U.S. Pat. No. 11,554,855, issuing Jan. 17, 2023), which claims the benefit of U.S. Provisional Application No. 62/955,855, filed on Dec. 31, 2019, which applications are each incorporated herein by reference.

TECHNICAL FIELD

The embodiments of the present disclosure relate to flight control systems for rotorcraft, such as helicopters, tiltrotor aircraft, vertical takeoff and landing (VTOL) craft, and the like.

BACKGROUND

There is potential for rotorcraft to get into a dangerous area of the flight envelope where vertical performance is compromised if excessive vertical velocities are developed at low airspeeds. Traditionally, aircraft flight manuals have warned aircrew about this flight condition called vortex ring state (VRS) and pilot training has taught them to avoid entering such situations. Operationally, it is not always apparent to the aircrew that VRS is about to occur, especially in poor visibility, at times of high workload (such as approach to landing) or if auxiliary systems such as autopilots are mishandled and cause inadvertent changes in forward or vertical speed. The onset of VRS can result in control limitations and restricted ability to arrest the high descent rates.

SUMMARY

An embodiment method includes monitoring a vertical speed of a rotorcraft, comparing the vertical speed to a vertical speed safety threshold, and performing vortex ring state (VRS) avoidance in response to the vertical speed exceeding the vertical speed safety threshold. The performing the VRS avoidance includes determining a power margin available from one or more engines of the rotorcraft, limiting the vertical speed of the rotorcraft in response to the power margin exceeding a threshold, and increasing a forward airspeed of the rotorcraft in response to the power margin not exceeding the threshold.

An embodiments device includes at least one processor, a non-transitory computer readable medium storing a program for execution by the at least one processor, with the program including instructions for monitoring a vertical speed of a rotorcraft, comparing the vertical speed to a vertical speed safety threshold, and performing vortex ring state (VRS) avoidance in response to the vertical speed exceeding the vertical speed safety threshold, where the performing the VRS avoidance includes determining a power margin available from one or more engines of the rotorcraft, limiting the vertical speed of the rotorcraft in response to the power margin power exceeding a threshold, and increasing a forward airspeed of the rotorcraft in response to the power margin power not exceeding the threshold.

An embodiment method includes monitoring, by a computer system of a rotorcraft, a vertical descent rate and a forward speed of the rotorcraft, determining, by the computer system, whether to perform vortex ring state (VRS) avoidance according to the vertical descent rate and the forward airspeed of the rotorcraft, and performing, by the computer system, in response to determining to perform the VRS avoidance, adjustment of one or more flight parameters of the rotorcraft according to a relationship between a power margin available from one or more engines of the rotorcraft and a power margin threshold.

BRIEF DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be configured variously and positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
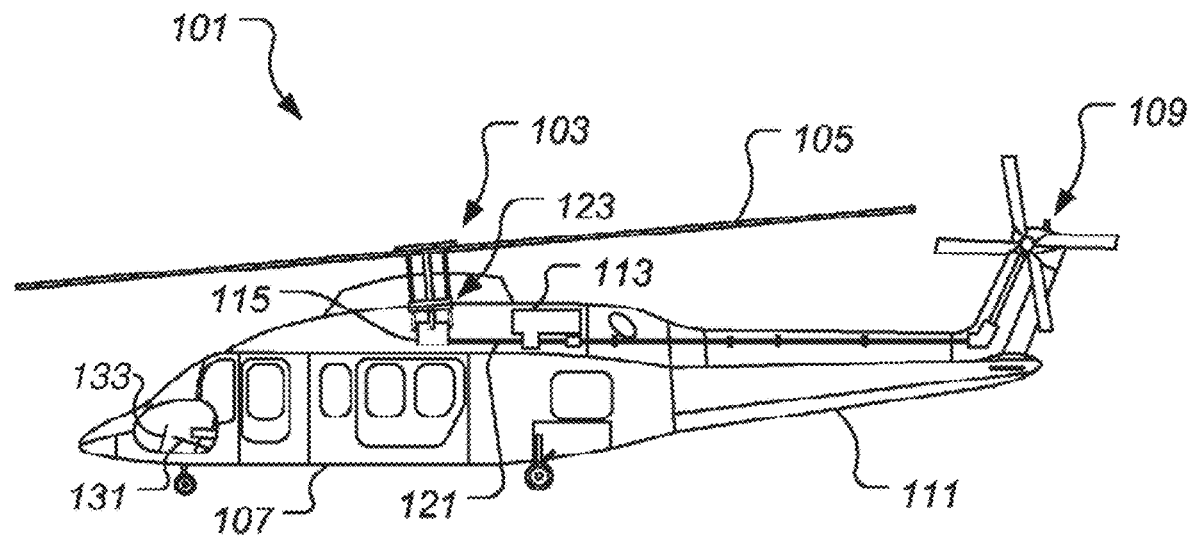
FIG. 1 is a side view of an rotorcraft, according to one example embodiment.

Referring now to FIG. 1 in the drawings, a rotorcraft 101 is illustrated. Rotorcraft 101 can include a rotor system 103 with a plurality of rotor blades 105. The pitch of each rotor blade 105 can be managed in order to selectively control direction, thrust, and lift of rotorcraft 101. For example, a swashplate mechanism 123 can be used to collectively and/or cyclically change the pitch of rotor blades 105. It should be appreciated that swashplate mechanism 123 is merely exemplary of one possible system for selectively controlling the pitch of rotor blades 105; for example, an independent blade control system is another exemplary system for selectively controlling the pitch of rotor blades 105. Rotorcraft 101 can include an airframe 107, anti-torque system 109, and an empennage 111. Torque can be supplied to rotor system 103 and anti-torque system 109 with at least one engine 113. A main rotor gearbox 115 is operably associated with an engine main output driveshaft 121 and the main rotor mast.

Rotorcraft 101 can include a collective stick 131 that is configured to allow a pilot to make a collective input to collectively change the pitch of the rotor blades 105. The collective stick 131 can take on any variety of implementation specific configurations. In one embodiment, collective stick 131 is a lever and a collective input is made by lifting up or pushing down the collective stick 131. In such an embodiment, lifting up the collective stick 131 can initiate a climb rate of the rotorcraft 101 by increasing the pitch of each rotor blade 105 in unison. Similarly, pushing down the collective stick 131 can initiate a descent rate by decreasing the pitch of each rotor blade 105 in unison. It should be appreciated that collective stick 131 can take on other implementation specific embodiments and collective pitch inputs can be made by other mechanisms and movements.

Rotorcraft 101 may also include a cyclic stick 133 that is configured to allow the pilot to make a cyclic input to change the pitch of the rotor blades 105 at different positions in the rotor blade rotation. The cyclic stick 133 can also take on any variety of implementation specific configurations. In one embodiment, cyclic stick 133 is a joystick-style control and cyclic input is made by moving the cyclic stick 133 in two dimensions to control lateral and forward or backward movement of the rotorcraft 101. For example, moving the cyclic stick 133 forward lowers the pitch of rotor blades as they swing along the right side, or advancing side, of the rotorcraft, and raises the pitch of the blades as the rotation of the rotor blades moves each blade across the left side, or retreating side, of the rotorcraft 101. This cyclic variation in blade pitch causes the tip-path-plane of the rotor disk to tilt its leading edge downward and its trailing edge upward and the rotorcraft 101 pitches nose down. In combination with collective input, cyclic input moves the rotorcraft 101 forward.

Rotorcraft 101 is merely illustrative of the wide variety of aircraft and vehicles that are particularly well suited to take advantage of the method and system of the present disclosure. It should be appreciated that other types of rotorcraft such as tiltrotors, tandem rotors, coaxial rotors, quad rotors, hexacopters, etc., can also utilize the method and system of the present disclosure.

Figure 2:
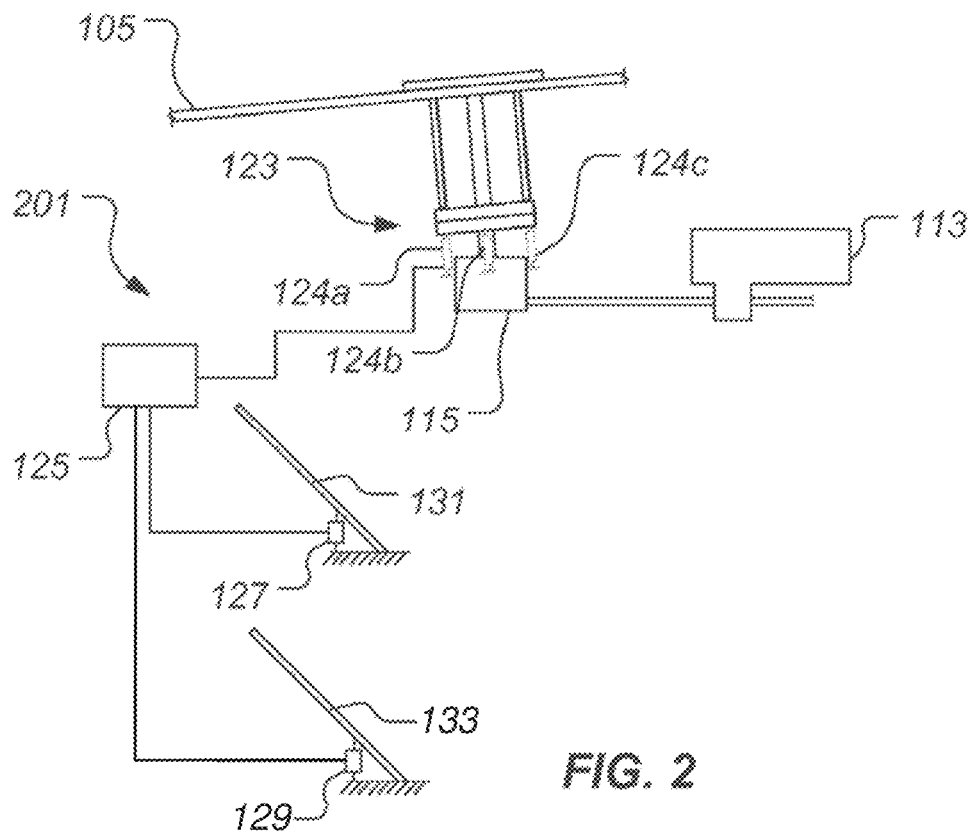
FIG. 2 is a schematic view of a system, according to one example embodiment.

Referring now also to FIG. 2 in the drawings, a system 201 is illustrated in conjunction with rotorcraft 101. It should be appreciated that though system 201 is illustrated with regard to rotorcraft 101, system 201 is also implementable on other aircraft as well. Further, it should be appreciated that system 201 can be implemented in a wide variety of configurations, depending in part on the flight control configuration of the aircraft.

System 201 is particularly well suited for implementation in aircraft having a flyby-wire flight control computer, such as flight control computer 125; however, a partial authority fly-by-wire aircraft can also utilize system 201. For example, system 201 can be utilized with a flight control system having actuators 124a, 124b, and 124c that can receive commands from a trim motor, autopilot system, or any other system that allows collective commands to be realized by collective actuators 124a, 124b, and 124c. A collective trim motor 127 is schematically illustrated in conjunction with collective stick 131, and a cyclic trim motor 129, or multiple cyclic trim motors, may be associated with the cyclic stick 133. Collective trim motor 127 and cyclic trim motor 129 can be any mechanism(s), device(s), system(s), etc., that can receive commands via flight control computer 125, and move the respective collective stick 131 or cyclic stick 133 in response to those commands so that the pilot is aware of actions made by the flight control computer. Motion of the collective stick 131 will provide appropriate input to one or more collective actuators, such as actuators 124a, 124b, and 124c. Similarly, motion of the cyclic stick 133 will provide appropriate input to the actuators 124a, 124b, and 124c shared by the collective stick 131 and cyclic stick 133, or to one or more actuators that are separate from the collective actuators and controlled by the cyclic stick 133. Further, collective trim motor 127 and cyclic trim motor 129 can be any mechanism(s), device(s), system(s), etc., that can selectively impart forces, resistance, movements, etc. to the respective collective stick 131 or cyclic stick 133, typically to provide additional tactile cueing to the pilot.

Figure 3:
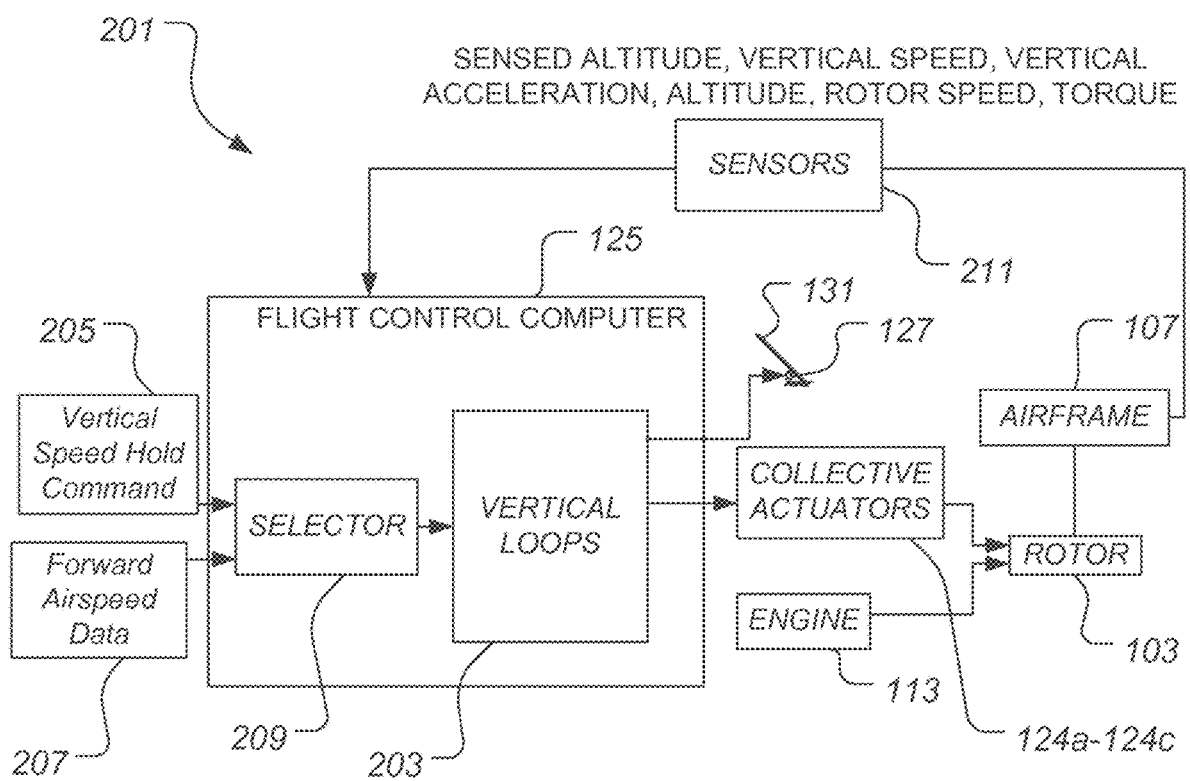
FIG. 3 is a schematic view of a system, according to one example embodiment.

Referring now also to FIG. 3, the system 201 of the present disclosure relates to a control augmentation system for rotorcraft 101, the augmentation system can utilize airspeed sensing (or the forward component of airspeed) and vertical speed sensing, and be at least partially integrated with a flight control computer 125. In one embodiment, system 201 is incorporated into a fly by wire control system of rotorcraft 101. An attempted flight maneuver into a dangerous part of the flight envelope can result in system 201 automatically raising the collective pitch of rotor blades 105 to avoid the potentially dangerous situation, but can be overridden by the pilot if desired. Depending on the situation, the automated response can increase forward airspeed by increasing the forward cyclic.

System 201 can include controls laws, which are illustrated as vertical speed loops 203. Vertical speed loops 203 can include vertical axis control laws configured to make control commands so that the rotorcraft 101 can achieve a desired vertical axis state, such as vertical speed or vertical altitude, for example. Furthermore, the vertical speed loops 203 can adjust for differences between a commanded vertical state and an actual vertical state. One example can be if the rotorcraft 101 is directed to hold the rotorcraft 101 at a commanded altitude, but the rotorcraft experiences a sudden downward gust of wind, then the vertical speed loops 203 will generate commands to collective actuators 124a-124c in order to increase pitch (therefore thrust) in order to maintain the commanded altitude.

A vertical speed hold command 205 is a command that can be generated by a pilot or an autopilot system. In one embodiment, a pilot vertical speed hold command can be a physical positioning of the collective stick 131 by the pilot that produces a descent rate. In another embodiment, the vertical speed hold command 205 can be an autopilot system that is automatically flying the aircraft. For example, an autopilot system can attempt to create an approach to a landing site and as a result make a vertical speed hold command 205. One example quantification of the descent rate can be a feet per minute (fpm) descent rate. For example, a−2500 fpm vertical axis descent rate is a greater than a−800 fpm descent rate.

A forward airspeed data 207 is data pertaining to the forward airspeed of the rotorcraft 101. In one embodiment, forward airspeed data 207 is real time data measured from a sensor 211, such as a pitot probe which can convert ram air and static pressure readings into a forward airspeed measurement. In another example embodiment, forward airspeed data 207 can be derived from GPS satellite data, for example.

Figure 4:
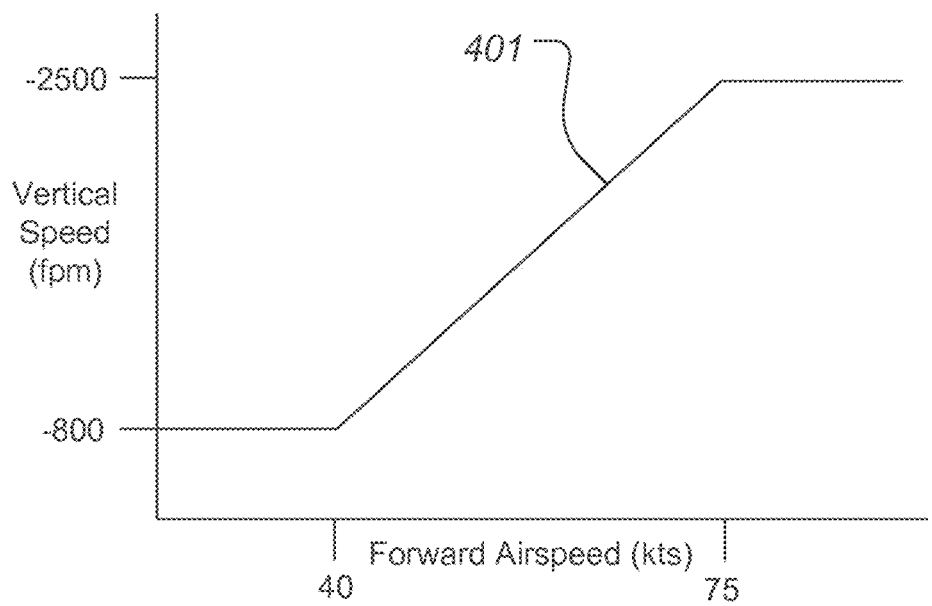
FIG. 4 is a graphical representation of a threshold, according to one example embodiment.

A selector 209 is configured to analyze the vertical speed hold command 205 and the forward airspeed data 207 and either allow the vertical speed hold command 205 to proceed to the vertical speed loops 203 and further as a pitch command to the collective actuators 124a-124c, or alternatively modify the vertical speed hold command in a way that increases collective pitch so that the rotorcraft 101 does not experience a vertical axis descent rate beyond a threshold. Referring now also to FIG. 4, an example threshold 401 is illustrated. Threshold 401 is a function of a vertical speed and forward airspeed. The threshold 401 is a maximum allowable descent rate in the vertical axis for a given forward airspeed with the aim of avoiding a potentially dangerous flight condition such as VRS. In the example embodiment, when the rotorcraft 101 has a forward airspeed of 40 knots (kts) or less, then system 201 will impede a collective control position that would otherwise result in a vertical axis descent rate greater than 800 fpm. As the forward speed of rotorcraft 101 increases and VRS is no longer a concern, the threshold 401 of the vertical descent speed also increases. Once the forward speed of rotorcraft 101 obtains 75 knots, the threshold 401 of the vertical descent speed is capped at 2500 fpm. It should be appreciated that the illustrated threshold 401 is merely an example of an implementation specific threshold curve.

Selector 209 is configured to identify a vertical speed hold command 205 that would exceed the threshold 401, and replace the vertical speed hold command 205 with the threshold value for the given forward airspeed. The threshold value command is received and processed by the vertical speed loop 203 control laws and further commanded to collective actuators 124a-124c. Further, commands can be sent from vertical speed loops 203 to trim motor 127 so that the collective stick 131 is impeded from decreasing collective pitch any further than the threshold value 401. In one embodiment, the pilot can override system 201 and decrease collective pitch beyond threshold value 401 for a given forward airspeed by overcoming the increase in the collective pitch provided by the system or the impeding force on collective stick 131 provided by trim motor 127.

System 201 is advantageously configured such that attempted flight into the prohibited part of the flight envelope will result in the vertical speed hold command being modified to the threshold 401, which is a predetermined vertical speed limit at that particular forward airspeed. The system 201 may be configured to not only modify the position of collective stick 131 to acquire the vertical speed threshold, but also to produce aural and/or visual alerts to the pilot. The pilot can override the vertical speed threshold 401 at any time by applying force/displacement to the collective stick 131. As a result, the system 201 automatically modulates collective input to preclude the rotorcraft from inadvertently entering dangerously high vertical speed conditions that could otherwise result in VRS, or a crash. One advantage of the system 201 of the present disclosure is that it is autonomous, reduces pilot workload, and does not require pilot awareness of the situation, which is one of the inherent dangers.

Figure 5:
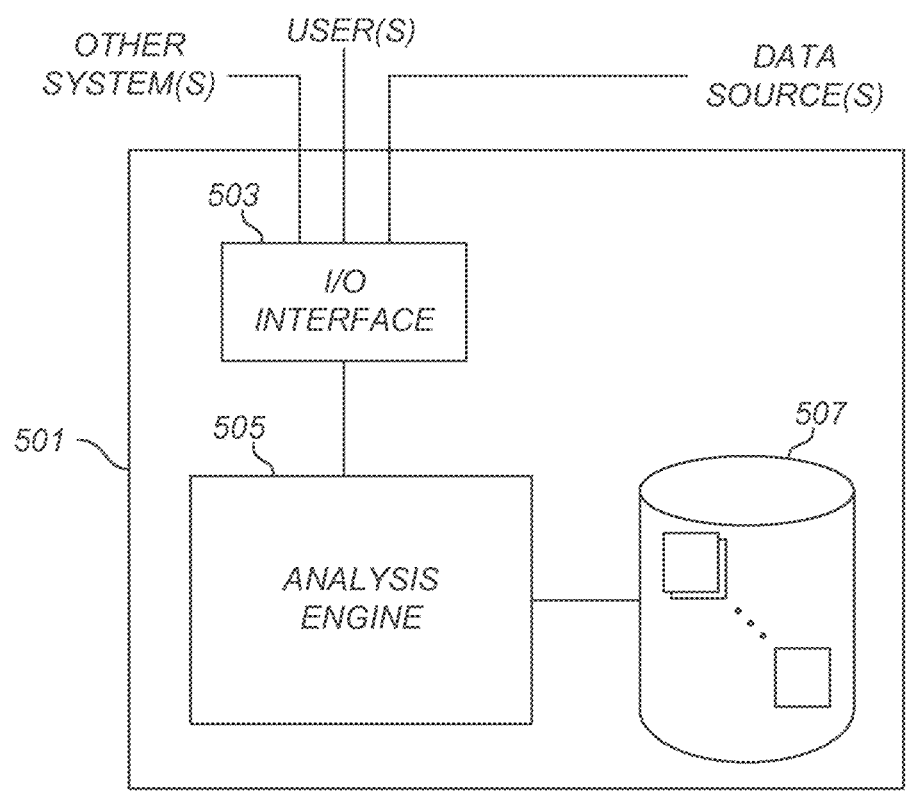
FIG. 5 is a schematic view of a computer system, according to one example embodiment.

Referring now also to FIG. 5, a computer system 501 is schematically illustrated. Computer system 501 can be configured for performing one or more functions with regard to the operation of the system and method further disclosed herein. Further, any processing and analysis can be partly or fully performed by computer system 501. Computer system 501 can be partly or fully integrated with other aircraft computer systems.

The system 501 can include an input/output (I/O) interface 503, an analysis engine 505, and a database 507. Alternative embodiments can combine or distribute the input/output (I/O) interface 503, analysis engine 505, and database 507, as desired. Embodiments of the system 501 can include one or more computers that include one or more processors and memories configured for performing tasks described herein. This can include, for example, a computer having a central processing unit (CPU) and nonvolatile memory such as a non-transitory computer readable medium that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks redundantly or distributed in any way among the one or more machines. It should also be appreciated that such machines need not be dedicated to performing tasks described herein, but instead can be multipurpose machines, for example computer workstations, that are suitable for also performing other tasks.

The I/O interface 503 can provide a communication link between external users, systems, and data sources and components of the system 501. The I/O interface 503 can be configured for allowing one or more users to input information to the system 501 via any known input device. Examples can include a keyboard, mouse, touch screen, and/or any other desired input device. The I/O interface 503 can be configured for allowing one or more users to receive information output from the system 501 via any known output device. Examples can include a display monitor, a printer, cockpit display, and/or any other desired output device. The I/O interface 503 can be configured for allowing other systems to communicate with the system 501. For example, the I/O interface 503 can allow one or more remote computer(s) to access information, input information, and/or remotely instruct the system 501 to perform one or more of the tasks described herein. The I/O interface 503 can be configured for allowing communication with one or more remote data sources. For example, the I/O interface 503 can allow one or more remote data source(s) to access information, input information, and/or remotely instruct the system 501 to perform one or more of the tasks described herein.

The database 507 provides persistent data storage for system 501. While the term "database" is primarily used, a memory or other suitable data storage arrangement may provide the functionality of the database 507. In alternative embodiments, the database 507 can be integral to or separate from the system 501 and can operate on one or more computers. The database 507 preferably provides non-volatile data storage for any information suitable to support the operation of the system and method disclosed herein, including various types of data discussed further herein. The analysis engine 505 can include various combinations of one or more processors, memories, and software components.

In some embodiments, the system 501 may be embodied as a flight control computer (FCC), flight director, partial authority flight control system, or the like. An FCC may include a memory having a program stored thereon that, when executed by the processor, cause the processor to implement the control laws that inhibit flight into the prohibited part of the flight envelope. In some embodiments, the FCC may modify the flight parameters of the rotorcraft according to the power margin of the rotorcraft. The FCC may have data associated with the dangerous part of the flight envelope. Flight commands or parameters that would take the rotorcraft into the restricted flight region or dangerous part of the flight envelope may be modified to avoid placing the rotorcraft in danger.

Figure 6:
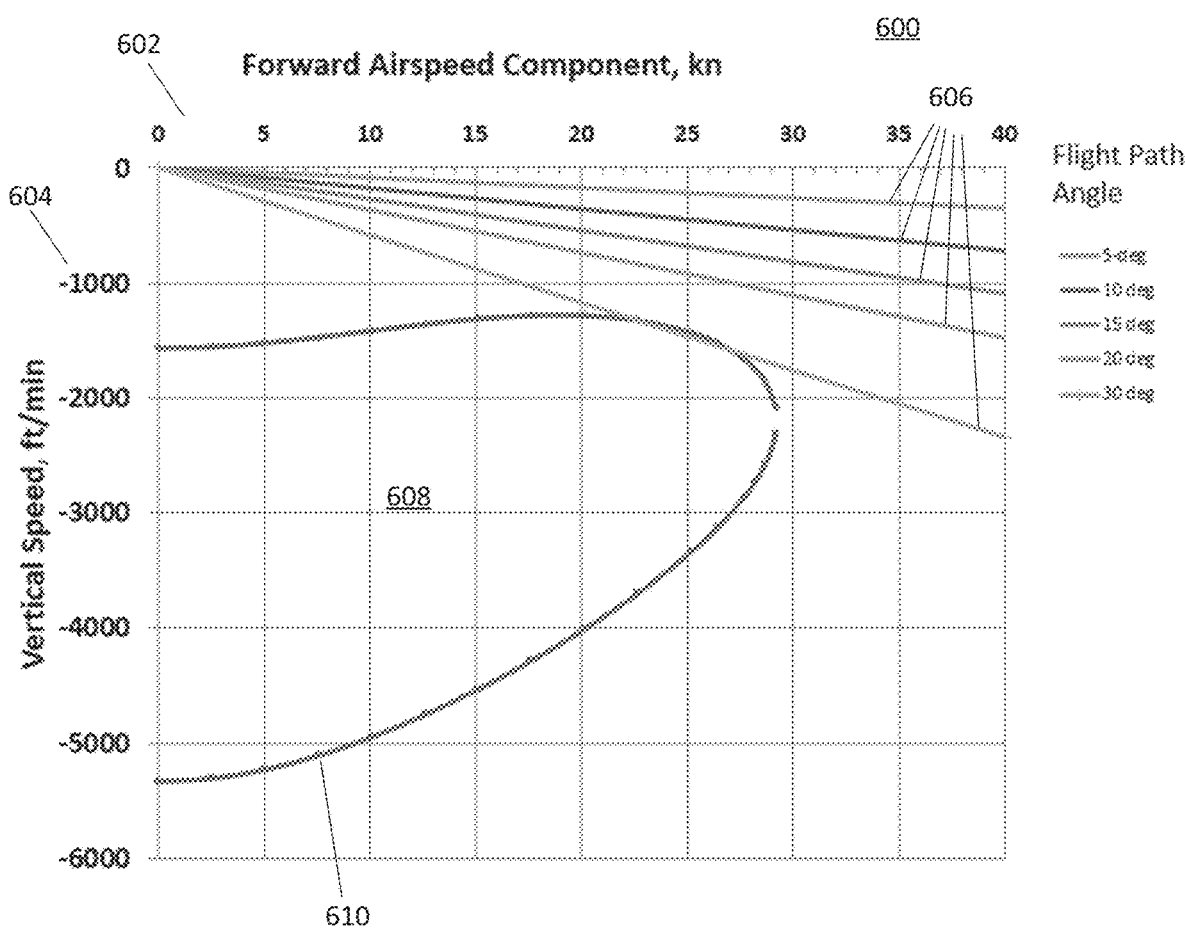
FIG. 6 illustrates a flight envelope with restricted flight region according to some embodiments.

FIG. 6 illustrates a flight envelope 60o with restricted flight region 608 according to some embodiments. The forward airspeed 602 and vertical speed 604 define the flight envelope 600. In the relevant portion of the flight envelope 600, the vertical speed 604 is negative, as the relevant portion of the flight envelope 60o is the portion of the flight envelope 60o where the rotorcraft is descending. Flight paths 606 illustrate various flight path angles, with associated forward airspeeds 602 and vertical speeds 604. The chart shows an example of a restricted flight region 608 of forward airspeed 602 and descent rate or vertical speed 604 where vortex ring state (VRS) exists. The restricted flight region 608 may be a region defined by forward airspeed and vertical speed or vertical descent rate, at which a rotorcraft, such as a helicopter, tiltrotor, vertical takeoff craft, or the like, when flying at a particular altitude, weight and temperature, may experience VRS. VRS is caused when a rotorcraft descends at the same speed as its vortex wake. The wake coalesces into a powerful vortex ring and the rotor experiences higher than usual downflowing air through the rotor. Relative to the downflowing air, the rotor is effectively placed in a climb state even though the rotorcraft is descending rapidly. Rotorcraft typically lack sufficient power and blade collective for overcoming these high rates of downflowing air through the rotor, resulting in the inability to arrest the descent rate. In some embodiments, the FCC may prevent the rotorcraft from entering a restricted flight region 608 that may be a dangerous part of the flight envelope 600.

The restricted flight region 608 may be bounded by a VRS boundary 610. Notably, when considering VRS, forward flight above certain speeds avoids the restricted flight region 608 altogether. In examining the VRS boundary 610, VRS may be avoided by increasing the forward speed or by reducing descent rate. The FCC may use an algorithm to calculate the VRS boundary 610, based, for example, on air density and aircraft gross weight. When the aircraft is below a certain forward airspeed (i.e., 35 knots), the FCC checks if there is sufficient power to avoid an uncommanded high descent rate as speed is further reduced. It should be noted that rotorcraft require increasing power levels to maintain level flight as they reduce airspeed, the highest power condition (for level flight) is hover. At high altitudes, a rotorcraft may have sufficient power maintain level flight at a particular air speed, but would not be able to hover due to the reduced air density. At high altitude, the reduction in air density raises the power required to hover, while reducing the engine power available. The difference between power available and power required is called power margin. If the power margin for hover or a reduced flight speed is positive, descent rate must still be managed to avoid VRS, and the FCC can provide a signal to the flight control system to prevent the descent rate from exceeding a limit vertical speed descent rate or vertical speed limit, such as 800 ft./min. or 1000 ft./min. If the power margin for hover or a reduced flight speed is negative, for example, when the engines are unable to provide sufficient power to arrest the descent rate, the FCC can provide a signal to the flight control system to inhibit further reduction in airspeed or to increase the airspeed, preserving or gaining power margin. With negative power margin, if airspeed is not increased, the rotorcraft descent rate will increase, and the rotorcraft may enter an unsafe VRS boundary 610.

In some embodiments, in cases where a rotorcraft lacks the power margin to manage its vertical descent rate if the flight speed is reduced, the FCC may prevent further airspeed reduction or increase forward speed to avoid negative power margin and prevent entering the restricted flight region 608, thus avoiding VRS altogether. For example, the FCC may determine that the power margin at a requested or intended reduced airspeed would initiate an uncommanded descent rate. The FCCs may then cause the rotorcraft to increase its forward speed, for example, by increasing forward cyclic pitch in the rotor system. At low airspeed, increasing the forward airspeed increases the power margin, giving the rotorcraft the ability to manage descent rate and avoid the restricted flight envelope. In another embodiment, the FCC may generate a cue to the pilot to indicate the best approach for avoiding negative power margin/VRS (collective or forward cyclic) or alert the pilot that the FCC is performing, or about to perform a VRS avoidance maneuver, or that the craft is approaching the VRS region. The cue could be a tactile (stick force), visual indication, or an audio command, and may be performed in place of, before, or in conjunction with, the VRS avoidance maneuver being performed by the FCC. The pilot may respond to the cue to increase forward speed, reduce vertical speed, or implement another maneuver to avoid VRS. Additionally, the cue may be provided until the rotorcraft flight parameters indicate that the rotorcraft is not in danger of entering VRS.

Figure 7A:
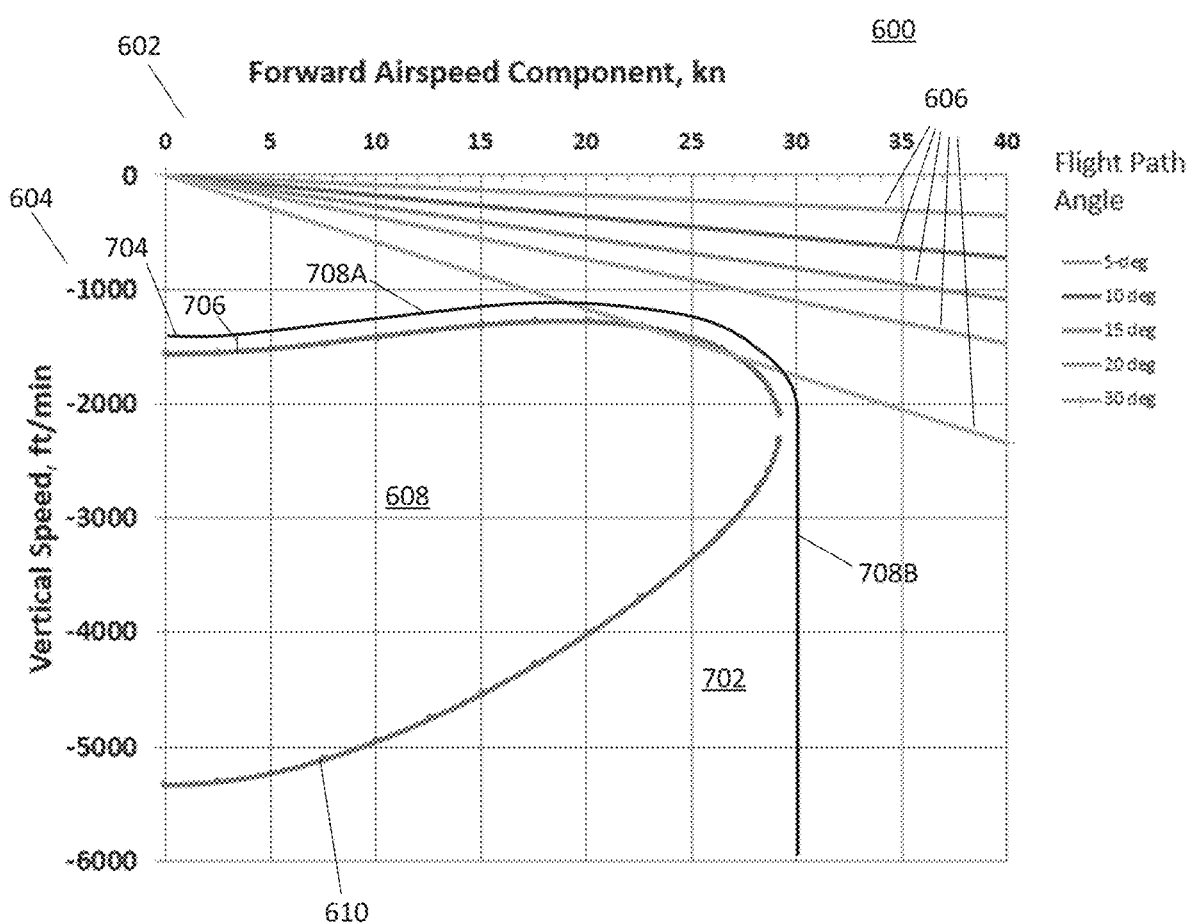
FIG. 7A illustrates a flight envelope with a safe flight envelope threshold according to some embodiments.

FIG. 7A illustrates a flight envelope 700 with a safe flight envelope threshold 704 according to some embodiments. The FCC may determine a safe flight envelope threshold 704 for a safe flight region 702 with a vertical speed margin 706 higher than the VRS boundary 610. The safe flight envelope threshold 704 may have a variable vertical speed safety threshold 708A, and a forward speed safety threshold 708B. The vertical speed margin 706 may, in some embodiments, be calculated according to a portion of the VRS boundary 610. The vertical speed margin 706 may be the separation between the variable vertical speed safety threshold 708A and the VRS boundary 610, and may be substantially constant. Thus, the variable vertical speed safety threshold 708A may vary with forward airspeed 602. The forward speed safety threshold 708B may be a speed at which VRS protection is not necessary, and may be at a greater forward speed than the edge of the VRS boundary 610, and may be a forward speed at which VRS protection is not needed.

Figure 7B:
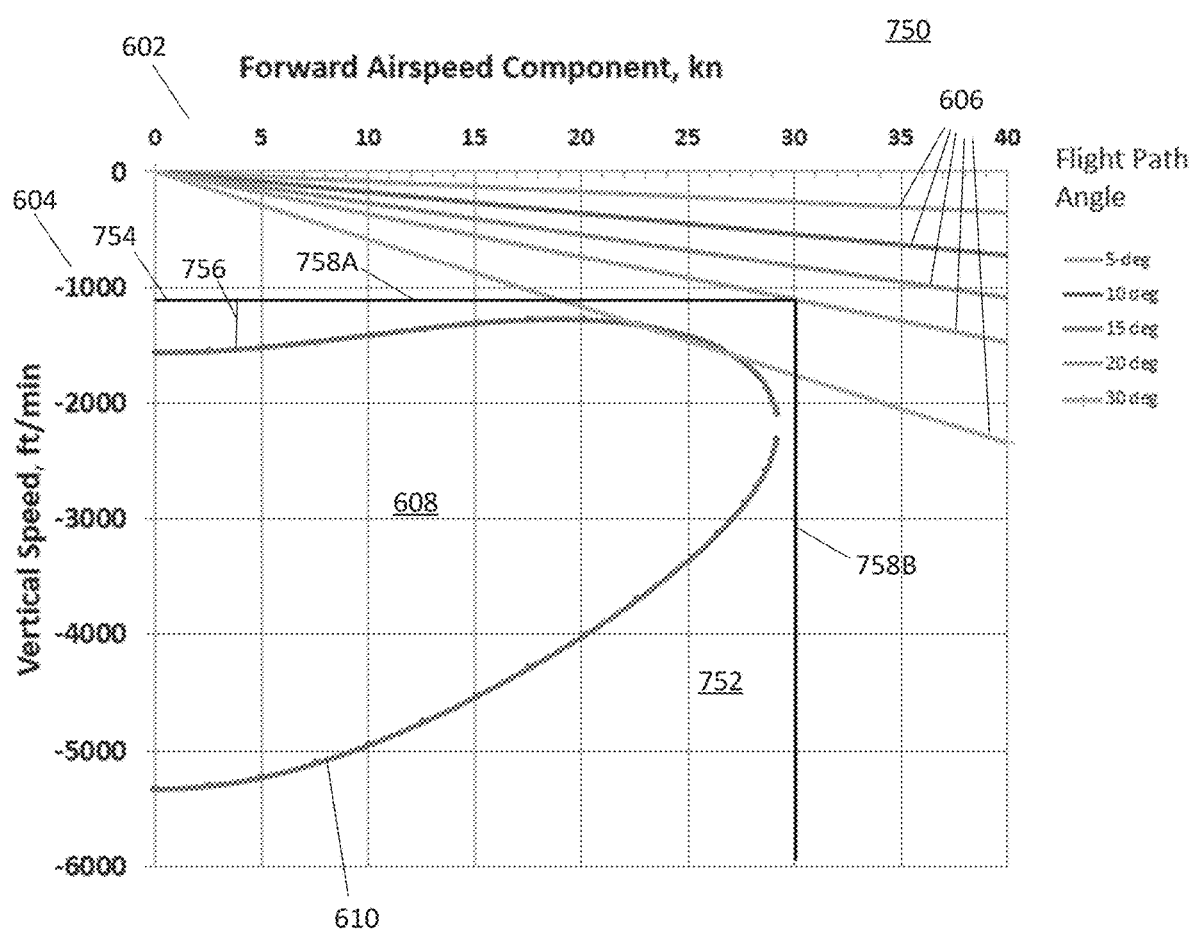
FIG. 7B illustrates a flight envelope with a safe flight envelope threshold according to some embodiments.

FIG. 7B illustrates a flight envelope 750 with a safe flight envelope threshold 754 according to some embodiments. In some embodiments, a safe flight envelope threshold 754 may have a constant vertical speed safety threshold 758A and a forward speed safety threshold 758B and may define a safe flight region 752. The constant vertical speed safety threshold 758A may be set at a predefined vertical speed, for example, an 800 ft./min. descent rate, a 1000 ft./min. descent rate, or another rate. The constant vertical speed safety threshold 758A may be set so that the constant vertical speed safety threshold 758A will be above all portions of the restricted flight region 608 and VRS boundary 610 for all potential rotorcraft operation parameters. Thus, the constant vertical speed safety threshold 808A and forward speed safety threshold 758B may be set so that the rotorcraft has margin to react and avoid operation in a flight environment that penetrates the VRS boundary 610. With the constant vertical speed safety threshold 758A being substantially constant, the vertical speed margin 756 depends on, and may be determined according to the forward speed and the VRS boundary 610.

Figure 8:
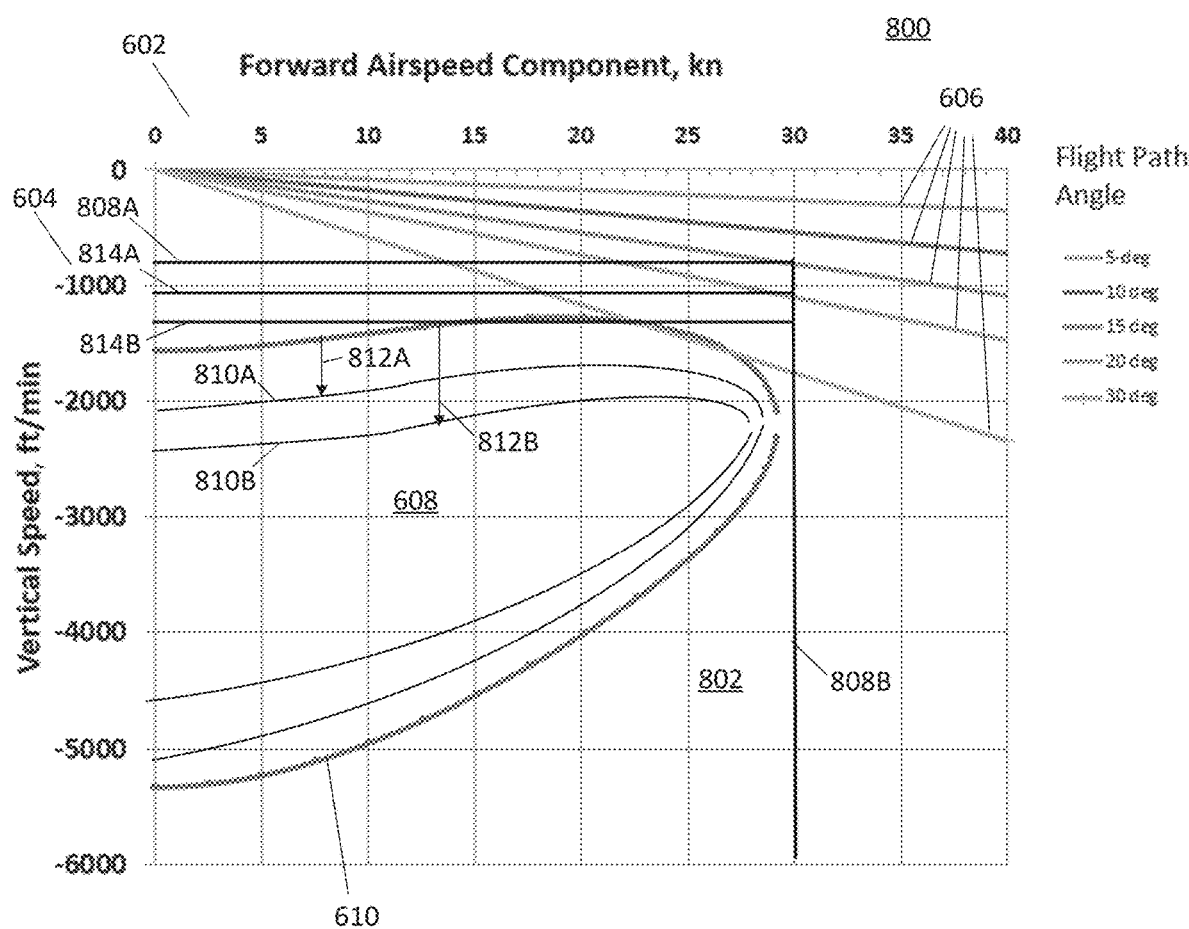
FIG. 8 illustrates a flight envelope with maneuvering VRS boundaries shifted due to maneuvering according to some embodiments.

FIG. 8 illustrates a flight envelope Boo with accelerated flight VRS boundaries 810A, 810B shifted due to maneuvering according to some embodiments. In general, VRS can be disrupted by maneuvering the rotorcraft because the rotor wake has more difficulty coalescing into a vortex ring if the rotorcraft is accelerating. Typically, the VRS boundary 610 is defined for 1 g thrust and relatively steady descent rates. However, it has been determined that the largest VRS boundary 610 is associated with a consistent craft attitude, while maneuvering tends to shift the VRS boundary 610 to a lower accelerated flight VRS boundary 810A, 810B. Additionally, more aggressive maneuvering tends to shrink the VRS boundary 601 to a greater degree. For example, a relatively mild maneuver, such as an airspeed acceleration, may result in the VRS boundary shifting to a first accelerated flight VRS boundary 810A that is below, or smaller than the normal VRS boundary. A more aggressive maneuver, such as a descending banked turn with a substantial yaw rate, may result in the VRS boundary 610 shifting to a second accelerated flight VRS boundary 810B that is below, or smaller than the first VRS boundary.

In some embodiments, a safe flight region 802 may be defined by a forward speed safety threshold 808B and a steady state vertical speed safety threshold 808A associated with the normal or steady state VRS boundary 610. During maneuvering, an accelerated flight vertical speed safety threshold 814A, 814B may define the safe flight region 802 since the VRS boundary is shifted to an accelerated flight VRS boundary 810A, 810B. Thus, a vertical speed safety threshold may vary according to changes in a VRS boundary, which may change due to operational parameters of the rotorcraft such as maneuvering, lateral speed, yaw rate, attitude, or the like. In some embodiments, a steady state VRS boundary 610 shifts by a shift 812A, 812B, resulting in a respective accelerated flight VRS boundary 810A, 810B. In some embodiments, the steady state vertical speed safety threshold 808A shifts to an accelerated flight vertical speed safety threshold 814A, 814B, which may be dependent on the associated VRS boundary 610, 810A, 810B. In some embodiments, the magnitude of the shift from the steady state vertical speed safety threshold 808A to the relevant accelerated flight vertical speed safety threshold 814A, 814B is related to, proportional to, associated with, or the same as the magnitude of shift 812A, 812B between the VRS boundary 610 and the accelerated flight VRS boundary 810A, 810B.

If higher descent rates at low forward airspeed are necessary or desired, the FCCs may initiate pre-programmed VRS suppression techniques such as a banked turn, roll-reversals rate, an increased lateral speed, or a combination of increased yaw and lateral speed such as a descending spiral maneuver. The VRS suppression technique may take advantage of the shift in the VRS boundary 610, due to maneuvering. This allows the aircraft to operate in a flight parameter region that would normally be within the normal VRS boundary 610 or steady state VRS boundary while avoiding the symptoms of VRS that include the inability to arrest descent rate.

Figure 9:
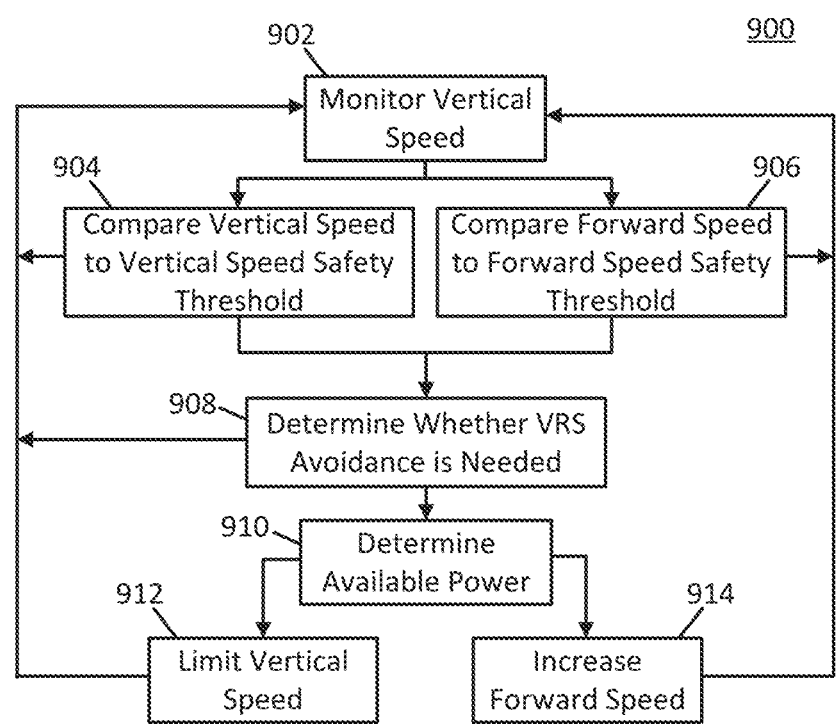
FIG. 9 is a flow diagram illustrating an embodiment method for implementing VRS protection according to the power margin of a rotorcraft.

FIG. 9 is a flow diagram illustrating an embodiment method 900 for implementing VRS protection according to the power margin of a rotorcraft. An FCC of a rotorcraft monitors the vertical speed of a rotorcraft in block 902. In block 904, the FCC compares the vertical speed to a vertical speed safety threshold. In some embodiments, the vertical speed safety threshold is a variable vertical speed safety threshold, and depends on the forward airspeed. In other embodiments, the vertical speed safety threshold is a constant vertical speed safety threshold, and is substantially constant and independent of the forward airspeed. The vertical speed safety threshold is at a vertical speed that is above the VRS boundary at the relevant forward airspeed.

In block 906, the FCC compares the forward airspeed to the forward airspeed safety threshold. In block 908, the FCC determines whether VRS avoidance is needed. The need for VRS avoidance is based on the forward speed being below the forward speed safety threshold, and, in some embodiments, also based on the vertical speed exceeding the vertical speed safety threshold. Thus, in some embodiments, the FCC may determine that VRS avoidance is needed if the forward speed is below the forward speed safety threshold and the vertical speed exceeds the vertical speed safety threshold, with the rate of descent being greater than the maximum rate of descent indicated by the vertical speed safety threshold. In some embodiments, the vertical speed safety threshold may be dependent on the forward speed, and in some embodiments, the vertical speed threshold may be substantially constant.

In some embodiments, the determination regarding whether VRS avoidance is needed may also be dependent on a rate of change of the vertical speed, or a command to change the vertical speed. For example, a rotorcraft at a moderate descent rate of 500 ft./min. descent may receive a command from a pilot to substantially reduce the collective setting, which would rapidly increase the rate of descent. Similarly, the rotorcraft may experience an updraft, wind, change in air density or pressure, or like, which causes a rapid effective change in the vertical speed. The FCC may determine an anticipated rate of descent or vertical speed based on the pilot command or change in vertical speed, and may make the determination of whether VRS avoidance is needed from the anticipated vertical speed. If the FCC determines that VRS avoidance is not needed, the FCC may continue monitoring the vertical speed in block 902.

If VRS avoidance is needed, the FCC may perform the VRS avoidance, and may, in block 910, determine the available power or a power margin. In some embodiments, the power margin or available power may be dependent on atmospheric state, gross weight or thrust of the rotorcraft or the like, and therefore, may be determined according to those factors. The FCC may receive one or more signals from, for example, ambient condition sensors, such as altitude, air density, temperature, etc. and an engine control computer (ECC) or the like, to determine the rotorcraft's power margin for the low forward airspeed flight regime where VRS exists. In some embodiments, if the rotorcraft power margin is positive, the FCC can command a reduction in the vertical of speed the rotorcraft to avoid VRS. If the power margin for arresting the descent rate is negative, the FCC can command a forward speed increase to avoid VRS. The FCC may, in some embodiments, determine the magnitude of the power margin, and a threshold or anticipated power requirement to increase the collective, cyclic, and/or power settings for the rotorcraft to a desired setting to avoid or remain above the vertical speed safety threshold. The FCC may determine whether the power margin is sufficient to implement the desired collective setting by comparing the power margin to a power margin threshold or power requirement. In some embodiments, the threshold may be a substantially constant value, or may be determined by the FCC according to, for example, the vertical speed safety threshold, the vertical speed, the rate of change of the vertical speed, the relationship between the vertical speed and the vertical speed safety threshold, a combination of one or more of the same, atmospheric conditions, or the like. In some embodiments, the FCC may adjust one or more flight parameters of the rotorcraft, such as airspeed, according to a relationship between the power margin and the threshold. In some embodiments, the FCC may adjust a first flight parameter if the power margin is above the threshold, and may adjust a second, different flight parameter if the power margin is below the threshold. In some embodiments, the power margin may be zero or negative, so the first flight parameter, which, in some embodiments, includes forward airspeed, may be adjusted to gain power margin until the power margin is positive or zero, and the second flight parameter may be adjusted if the power margin is negative. In some embodiments, the flight parameters adjusted by the FCC according to the power margin may be the vertical speed, the forward airspeed, and combination of vertical speed and forward airspeed, or one or more other flight parameters such a heading, yaw rate, roll, or pitch angle, or the like.

If the power margin is sufficient to implement the desired collective setting, then in block 912, the FCC limits the vertical speed by providing an adjusted collective setting signal or command to change or modify the current collective setting or to modify a collective command from the pilot. It should be noted that, in the low forward speed regime, power margin will increase as forward speed increases.

If the power margin is not sufficient to implement the desired collective setting, then, in block 914, the FCC increases the forward speed or airspeed of the rotorcraft by providing an adjusted cyclic setting signal or command to change or modify the current cyclic setting or to modify a cyclic command from the pilot. In such a situation, in some embodiments, the FCC may also reject or limit further changes in the vertical speed to prevent the rotorcraft from increasing its vertical descent rate. The limited vertical speed or increased forward speed implemented by the FCC may continue until the vertical descent rate or vertical speed moves above the vertical speed safety threshold by a predetermined amount or for a predetermined time, or until the rotorcraft forward airspeed reaches or exceeds the forward speed safety threshold. The FCC may also continue to monitor the vertical speed in block 902 to provide continuous protection against the rotorcraft entering VRS.

Additionally, in some embodiments, the FCCs may implement a VRS suppression or VRS recovery technique that may increase a lateral speed, yaw rate, or other flight parameter as part of the VRS avoidance. For example, in an embodiment where the rotorcraft is a helicopter, the FCCs may execute VRS avoidance, or initiate recovery from VRS by maintaining the rotor revolutions per minute (RPM), and increasing the lateral speed of the helicopter the direction of tail rotor thrust, while maintaining the helicopter heading as an alternative to, or in addition to, increasing the forward speed. Thus, the FCCs may generate cyclic commands that increase the forward or lateral speed, yaw rate, or the like, to avoid or recover from the VRS. The FCCs may maintain or increase collective to expedite recovery from the VRS condition.

In some embodiments, the FCCs may use a combination of rotor or mast tilting in combination with cyclic commands as part of the VRS avoidance or VRS recovery. For example, in an embodiment where the rotorcraft is a tiltrotor, the FCCs may maintain power or thrust at the engines, and also apply forward nacelle tilt in addition to forward cyclic. In some embodiments, the FCCs may, in response to determining that VRS avoidance is needed, apply a forward nacelle tilt between about 10 and 20 degrees, or in other embodiments, a nacelle tilt of about 16 degrees. The forward nacelle tilt provides forward thrust in addition to the forward thrust resulting from the forward cyclic to achieve the desired increased forward speed more rapidly.

An embodiment method includes monitoring a vertical speed of a rotorcraft, comparing the vertical speed to a vertical speed safety threshold, and performing vortex ring state (VRS) avoidance in response to the vertical speed exceeding the vertical speed safety threshold. The performing the VRS avoidance includes determining a power margin available from one or more engines of the rotorcraft, limiting the vertical speed of the rotorcraft in response to the power margin exceeding a threshold, and increasing a forward airspeed of the rotorcraft in response to the power margin not exceeding the threshold.

In some embodiments, performing the VRS avoidance includes performing the VRS avoidance in response to the vertical speed exceeding the vertical speed safety threshold and further in response to the forward airspeed of the rotorcraft being below a forward airspeed safety threshold. In some embodiments, at least one of the vertical speed safety threshold is about an 800 ft./min. descent rate, or the forward airspeed safety threshold is about 35 knots. In some embodiments, wherein the vertical speed safety threshold is less than a VRS boundary defining a restricted flight region of a flight envelope for the rotorcraft. In some embodiments, the limiting the vertical speed of the rotorcraft includes providing an adjusted collective setting signal that modifies at least one of a current collective setting or a collective command from a pilot of the rotorcraft, and the increasing the forward airspeed of the rotorcraft includes providing an adjusted cyclic setting signal that modifies at least one of a current cyclic setting or a cyclic command from the pilot. In some embodiments, the performing the VRS avoidance further includes cueing a pilot of the rotorcraft regarding avoiding the VRS.

An embodiments device includes at least one processor, a non-transitory computer readable medium storing a program for execution by the at least one processor, with the program including instructions for monitoring a vertical speed of a rotorcraft, comparing the vertical speed to a vertical speed safety threshold, and performing vortex ring state (VRS) avoidance in response to the vertical speed exceeding the vertical speed safety threshold, where the performing the VRS avoidance includes determining a power margin available from one or more engines of the rotorcraft, limiting the vertical speed of the rotorcraft in response to the power margin power exceeding a threshold, and increasing a forward airspeed of the rotorcraft in response to the power margin power not exceeding the threshold.

In some embodiments, the instructions for performing the VRS avoidance include instructions for performing the VRS avoidance in response to the vertical speed exceeding the vertical speed safety threshold and further in response to the forward airspeed of the rotorcraft being below a forward airspeed safety threshold. In some embodiments, the vertical speed safety threshold is about an 800 ft./min. descent rate, and wherein the forward airspeed safety threshold is about 35 knots. In some embodiments, the vertical speed safety threshold is less than a VRS boundary and the forward speed safety threshold is greater than the VRS boundary defining a restricted flight region of a flight envelope for the rotorcraft. In some embodiments, the instructions for limiting the vertical speed of the rotorcraft include instructions for providing an adjusted collective setting signal that modifies at least one of a current collective setting or a collective command from a pilot of the rotorcraft, and the instructions for increasing the forward airspeed of the rotorcraft include instructions for providing an adjusted cyclic setting signal that modifies at least one of a current cyclic setting or a cyclic command from the pilot. In some embodiments, the vertical speed safety threshold is a variable vertical speed safety threshold that varies according to the forward airspeed of the rotorcraft.

An embodiment method includes monitoring, by a computer system of a rotorcraft, a vertical descent rate and a forward speed of the rotorcraft, determining, by the computer system, whether to perform vortex ring state (VRS) avoidance according to the vertical descent rate and the forward airspeed of the rotorcraft, and performing, by the computer system, in response to determining to perform the VRS avoidance, adjustment of one or more flight parameters of the rotorcraft according to a relationship between a power margin available from one or more engines of the rotorcraft and a power margin threshold.

In some embodiments, the one or more flight parameters include a vertical descent rate of the rotorcraft and the forward airspeed of the rotorcraft. In some embodiments, the performing the adjustment of one or more flight parameters of the rotorcraft includes limiting the vertical descent rate of the rotorcraft in response to the power margin exceeding the power margin threshold. In some embodiments, the performing the adjustment of one or more flight parameters of the rotorcraft includes increasing the forward airspeed of the rotorcraft in response to the power margin power not exceeding the power margin threshold. In some embodiments, the increasing the forward airspeed of the rotorcraft comprises increasing the forward airspeed of the rotorcraft until the forward airspeed of the rotorcraft exceeds a forward airspeed safety threshold. In some embodiments, the determining whether to perform the VRS avoidance includes determining, by the computer system, to perform the VRS avoidance in response to the vertical descent rate exceeding a vertical speed safety threshold. In some embodiments, the determining whether to perform the VRS avoidance includes determining, by the computer system, to perform the VRS avoidance in response to the vertical descent rate exceeding a vertical speed safety threshold and further in response to the forward airspeed of the rotorcraft being below a forward airspeed safety threshold. In some embodiments, the vertical speed safety threshold is a vertical descent rate that is less than a VRS boundary defining a restricted flight region of a flight envelope for the rotorcraft, and the forward speed threshold is greater than the VRS boundary defining a restricted flight region.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the disclosure. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S. C. § 112 as it exists on the date of filing hereof unless the words "means for" or "step for" are explicitly used in the particular claim.

What is claimed is:

1. A method, comprising:
monitoring a vertical speed of a rotorcraft and a forward airspeed of the rotorcraft; and
performing vortex ring state (VRS) avoidance according to at least one of the vertical speed or the forward airspeed, wherein the performing VRS avoidance comprises:
causing the rotorcraft to avoid operating near a restricted region of a rotorcraft flight envelope by controlling flight parameters of the rotorcraft, wherein the controlling the flight parameters of the rotorcraft comprises performing at least one of:
controlling the vertical speed of the rotorcraft; or
controlling the forward airspeed.

2. The method of claim 1, wherein the causing the rotorcraft to avoid operating at least near the restricted region comprises causing the rotorcraft to operate outside a vertical speed safety threshold, wherein the vertical speed safety threshold is separated from a portion of the restricted region by a vertical speed margin.

3. The method of claim 2, wherein the vertical speed margin from the restricted region is substantially constant, and wherein the vertical speed safety threshold varies with the forward airspeed, and wherein the vertical speed safety threshold is outside all portions of the restricted region.

4. The method of claim 2, wherein the vertical speed safety threshold is substantially constant, wherein the vertical speed safety threshold is outside all portions of the restricted region, and wherein the vertical speed margin is associated with at least the forward airspeed and a boundary of the restricted region.

5. The method of claim 1, wherein the performing the VRS avoidance further comprises determining an accelerated flight VRS boundary of the restricted region of the flight envelope according to operational parameters of the rotorcraft; and
wherein the performing the VRS avoidance comprises controlling the vertical speed of the rotorcraft according to an accelerated flight vertical speed safety threshold associated with the accelerated flight VRS boundary.

6. The method of claim 1, wherein the performing the VRS avoidance further comprises determining an accelerated flight VRS boundary of the restricted region of the rotorcraft flight envelope according to operational parameters of the rotorcraft; and wherein the performing the VRS avoidance comprises controlling the forward airspeed of the rotorcraft and wherein the performing the VRS avoidance further comprises controlling a shift in the accelerated flight VRS boundary by initiating at least one VRS suppression technique.

7. The method of claim 6, wherein the at least one VRS suppression technique comprises one or more of a banked turn, increasing a lateral speed, increasing a yaw and the lateral speed, or a roll-reversal.

8. A device, comprising:
at least one processor;
a non-transitory computer readable medium storing a program for execution by the at least one processor, the program comprising instructions for:
monitoring a vertical speed of a rotorcraft and a forward airspeed of the rotorcraft; and
performing vortex ring state (VRS) avoidance according to at least one of the vertical speed or the forward airspeed, wherein the performing VRS avoidance comprises:
causing the rotorcraft to avoid operating at least near a restricted flight region of a flight envelope for the rotorcraft by controlling flight parameters of the rotorcraft, wherein the controlling the flight parameters of the rotorcraft comprises performing at least one of:
controlling the vertical speed of the rotorcraft; or
controlling the forward airspeed.

9. The device of claim 8, wherein the instructions for causing the rotorcraft to avoid operating at least near the restricted flight region include instructions for causing the rotorcraft to operate outside a vertical speed safety threshold, wherein the vertical speed safety threshold is separated by a vertical speed margin from a portion of the restricted flight region.

10. The device of claim 9, wherein the vertical speed margin is substantially constant, and wherein the vertical speed safety threshold is a variable vertical speed safety threshold that varies with the forward airspeed, wherein the vertical speed safety threshold is outside all portions of the restricted flight region.

11. The device of claim 9, wherein the vertical speed safety threshold is substantially constant, wherein the vertical speed safety threshold is outside all portions of the restricted flight region, and wherein the vertical speed margin is associated with at least the forward airspeed and a boundary of the restricted flight region.

12. The device of claim 8, wherein the instructions for performing the VRS avoidance include instructions for determining an accelerated flight VRS boundary of the restricted flight region of the flight envelope according to operational parameters of the rotorcraft; and
wherein the instructions for performing the VRS avoidance include instructions for controlling the vertical speed of the rotorcraft according to an accelerated flight vertical speed safety threshold associated with the accelerated flight VRS boundary.

13. The device of claim 8, wherein the instructions for performing the VRS avoidance include instructions for determining an accelerated flight VRS boundary of the restricted flight region of the flight envelope according to operational parameters of the rotorcraft; and
wherein the instructions for performing the VRS avoidance include instructions for controlling the forward airspeed of the rotorcraft and wherein the performing the VRS avoidance further comprises controlling a shift in the accelerated flight VRS boundary by initiating at least one VRS suppression technique.

14. The device of claim 13, wherein the at least one VRS suppression technique comprises one or more of a banked turn, increasing a lateral speed, increasing a yaw and the lateral speed, or a roll-reversal.

15. A rotorcraft, comprising:
one or more flight controls;
a flight control computer (FCC) configured to:
monitor a vertical speed of the rotorcraft and a forward airspeed of the rotorcraft; and
perform vortex ring state (VRS) avoidance according to at least one of the vertical speed or the forward airspeed, wherein performing the VRS avoidance comprises:
causing the rotorcraft to avoid operating near a restricted flight region of a flight envelope for the rotorcraft by controlling flight parameters of the rotorcraft, wherein the controlling the flight parameters of the rotorcraft comprises performing at least one of:
controlling the vertical speed of the rotorcraft; or
controlling the forward airspeed.

16. The rotorcraft of claim 15, wherein causing the rotorcraft to avoid operating at least near the restricted flight region comprises causing the rotorcraft to operate outside a vertical speed safety threshold, wherein the vertical speed safety threshold is separated from a portion of the restricted flight region by a vertical speed margin.

17. The rotorcraft of claim 16, wherein the vertical speed margin is substantially constant, and wherein the vertical speed safety threshold varies with the forward airspeed, wherein the vertical speed safety threshold is outside all portions of the restricted flight region.

18. The rotorcraft of claim 16, wherein the vertical speed safety threshold is substantially constant, wherein the vertical speed safety threshold is outside all portions of the restricted flight region, and wherein the vertical speed margin is associated with at least the forward airspeed and a boundary of the restricted flight region.

19. The rotorcraft of claim 15, wherein the performing the VRS avoidance further comprises determining an accelerated flight VRS boundary of the restricted flight region of the flight envelope according to operational parameters of the rotorcraft; and
wherein the performing the VRS avoidance comprises controlling the vertical speed of the rotorcraft according to an accelerated flight vertical speed safety threshold associated with the accelerated flight VRS boundary.

20. The rotorcraft of claim 15, wherein the performing the VRS avoidance further comprises determining an accelerated flight VRS boundary of the restricted flight region of the flight envelope according to operational parameters of the rotorcraft; and
wherein performing the VRS avoidance comprises controlling the forward airspeed of the rotorcraft and wherein the performing the VRS avoidance further comprises controlling a shift in the accelerated flight VRS boundary by initiating at least one VRS suppression technique, wherein the at least one VRS suppression technique comprises one or more of a banked turn, increasing a lateral speed, increasing a yaw and the lateral speed, or a roll-reversal.

\* \* \* \* \*